Figure 1:
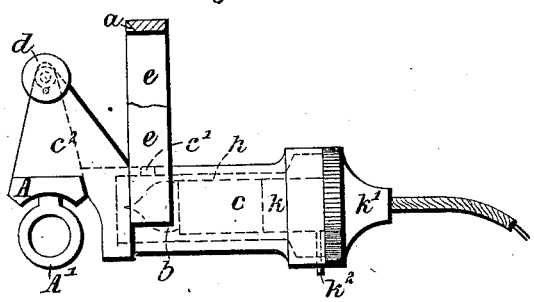

(No Model.)  4 Sheets—Sheet 1.

H. H. GRENFELL.
SIGHT FOR GUNS.

No. 429,030.  Patented May 27, 1890.

(No Model.) 4 Sheets—Sheet 2.

H. H. GRENFELL.
SIGHT FOR GUNS.

No. 429,030. Patented May 27, 1890.

Witnesses:
J. A. Rutherford.
J. G. Meyers Jr.

Inventor:
Hubert H. Grenfell
By James L. Norris.
Attorney (No Model.) 4 Sheets—Sheet 3.
H. H. GRENFELL.
SIGHT FOR GUNS.

No. 429,030. Patented May 27, 1890.

Witnesses:— Inventor:
J. A. Rutherford. Hubert H. Grenfell
J. F. Meyers Jr. By James L. Norris.
Attorney (No Model.) 4 Sheets—Sheet 4.
H. H. GRENFELL.
SIGHT FOR GUNS.
No. 429,030. Patented May 27, 1890.
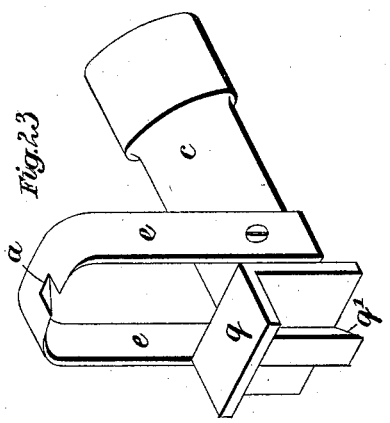
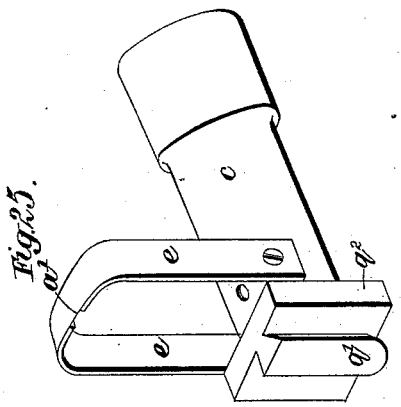
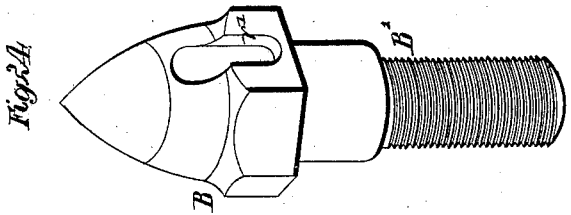
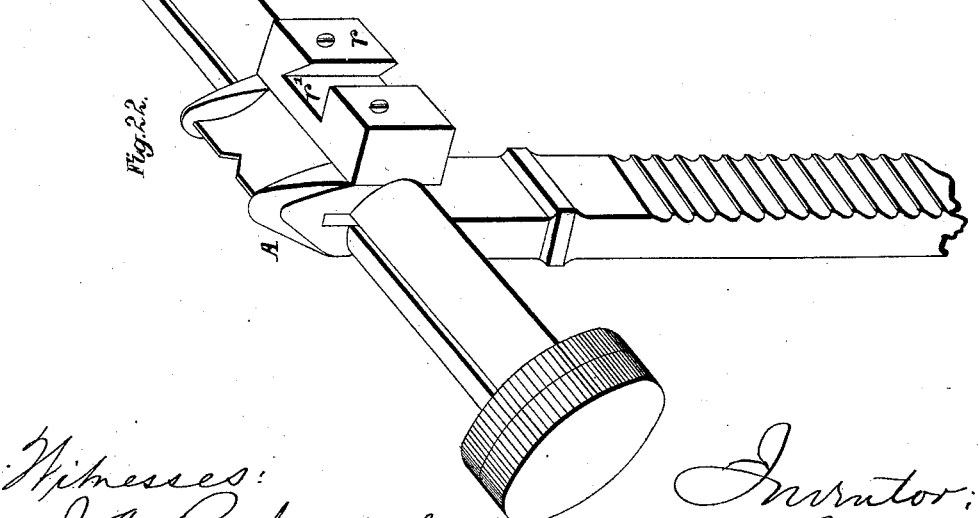

UNITED STATES PATENT OFFICE.

HUBERT HENRY GRENFELL, OF LONDON, ENGLAND.

SIGHT FOR GUNS.

SPECIFICATION forming part of Letters Patent No. 429,030, dated May 27, 1890.

Application filed January 16, 1890. Serial No. 337,037. (No model.)

*To all whom it may concern:*

Be it known that I, HUBERT HENRY GRENFELL, late Captain Royal Navy, a subject of the Queen of Great Britain, and a resident of London, England, have invented certain new and useful Improvements in Sights for Guns, of which the following is a specification, reference being had to the accompanying drawings.

My invention relates to illuminated or night sights for guns.

It is essential in the use of guns at night that the sighting devices should present to the eye of the observer a bright or luminous point or surface. Various devices have been employed or suggested for this purpose—such, for example, as an electric lamp so arranged that it is visible and will project rays of light directly along the line of sight, or a lens arranged in combination with a concealed or screened lamp to refract rays of light along to the eye of the observer, and in some instances lamps and reflectors have been used in combination with lenses for the sighting of guns at night. These devices are open to objection for various reasons, among which may be mentioned the following, viz: They have to be so constructed that the supports for the lamps or lenses are solid parts, which necessarily obstruct the vision. None of them permit the observer to look through the space immediately below the illuminated point, and therefore, although in other respects the apparatus may be well adapted to serve its purpose, its efficiency is greatly impaired. Moreover, the glass or other brittle transparent substance used for refracting the light is very liable to be broken.

By my invention I am enabled to construct an illuminated sight which is free from these objections—that is to say, to combine with suitable means for affording the necessary illumination novel reflecting devices which will not be liable to injury, and which are applied to the gun without the use of socket pieces or holders which would obstruct the view—such, for example, as are required in the night-sights heretofore described, for carrying the lamp or the transparent substance through which rays of light from the lamp are refracted along the line of sight. My reflectors, moreover, differ from those heretofore used for sighting guns, as will be apparent from the following description:

In carrying my invention into practice I provide the sight with one or more reflecting-surfaces, which are so arranged in combination with a concealed or screened lamp that, while no direct rays of light from the lamp reach the eye of the observer, some of the rays of light emanating from the lamp will impinge upon the reflecting surface or surfaces and be thereby reflected along the line of sight without having to pass through a refracting body or lens. For a reflector I prefer to use a thin strip of metal, which is formed on or attached to the lamp-holder or to the ordinary day-sight of the gun, and which has its rear edge or a portion of the same so formed and arranged that it reflects the light toward the rear of the gun.

Instead of a thin flat strip of metal I sometimes use a small metal rod or piece of wire for the reflector. I prefer to use unoxidizable metal and to burnish or brighten a small portion of the strip, rod, or wire, so that it will reflect the light in the proper direction, the other parts of the strip, rod, or wire being made non-reflective by any suitable means.

Figure 2:
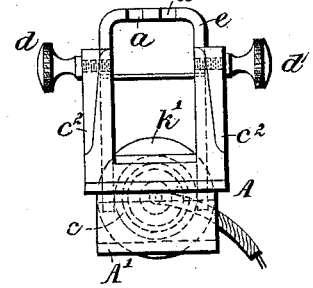
Figure 3:
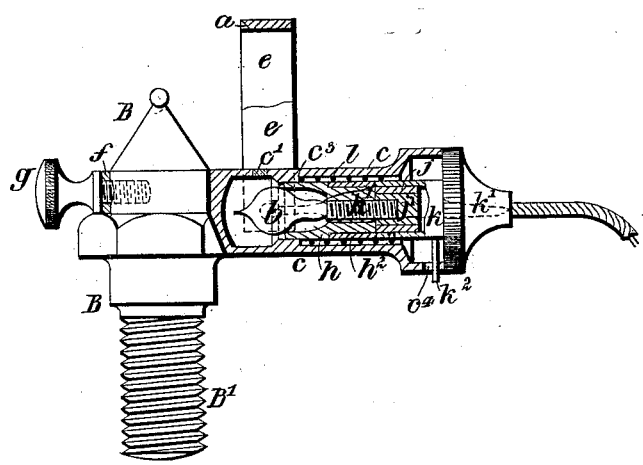
Figure 4:
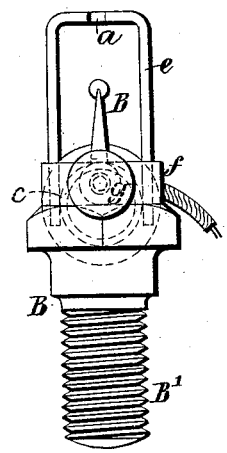
Figure 5:
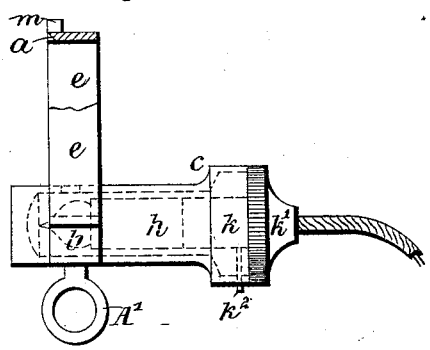
Figure 6:
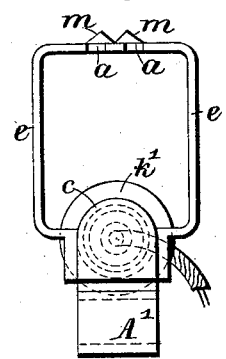
Figure 7:
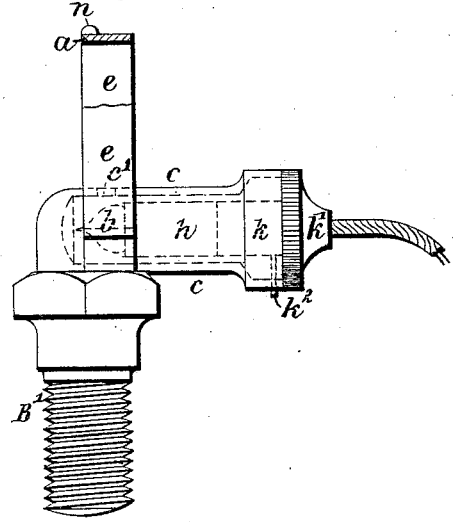
Figure 8:
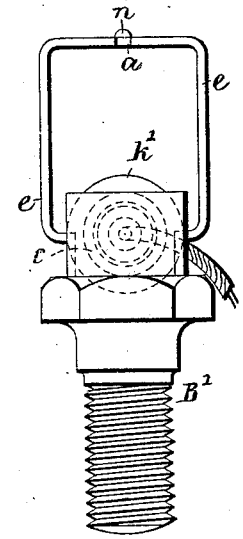
Figure 9:
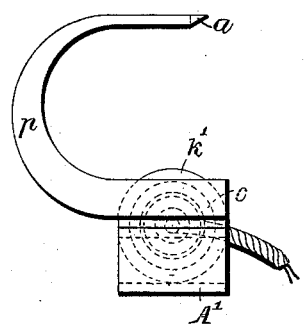
Figure 10:
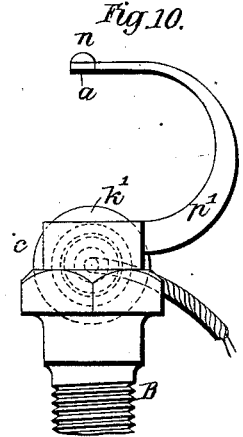
Figure 11:
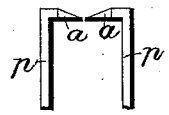
Figure 17:
Figure 18:
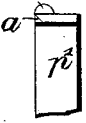
Figure 19:
Figure 20:
Figure 21:
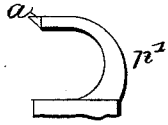

In the accompanying drawings, Figure 1 is a side elevation, partly in vertical central section, and Fig. 2 a rear elevation, showing one form of my improved illuminated sight applied to an ordinary day rear sight in such a manner that it can be readily removed therefrom when not required for use. Fig. 3 is a side elevation, partly in vertical central section, and Fig. 4 a rear elevation, showing a corresponding illuminated sight applied to an ordinary day fore sight, so that it can be readily removed therefrom. Fig. 5 is a side elevation, partly in vertical section, and Fig. 6 a rear elevation, showing a combined day and night rear sight constructed according to my invention. Fig. 7 is a side elevation, partly in vertical central section, and Fig. 8 a rear elevation, showing a corresponding fore sight. Fig. 9 is a rear elevation of another form of my combined day and night rear sight, and Fig. 10 is a rear elevation of a corresponding fore sight. Fig. 11 is a rear elevation, and Fig. 12 a side elevation, illustrating another modification of the rear sight. Fig. 13 is a rear elevation, and Fig. 14 a vertical longitudinal section, illustrating a correspondingly-modified fore sight. Figs. 15 and 16 and 17 and 18 illustrate rear and side elevations, respectively, of still another modification of the rear and fore sight. Figs. 19, 20, and 21 are rear and side elevations illustrating still other modifications of the sights. Figs. 22 and 23 are perspective views illustrating the rear night-sight attachment, and Figs. 24 and 25 are similar views showing the fore night-sight attachment.

Like letters indicate corresponding parts throughout the drawings.

A indicates a rear sight, and B a fore sight, such as are ordinarily employed in the daytime.

$a\ a$ are the reflecting-surfaces of my improved rear and fore night-sights. Each of the said night-sights is provided with an electric incandescent lamp $b$, which is concealed or inclosed in a socket or holder $c$, provided with a hole $c'$ for the passage of rays of light to impinge upon the reflecting-surface of the said sight and be thereby directed toward the observer.

In the illuminated rear sight (shown in Figs. 1 and 2) the socket $c$ is provided with two arms or projections $c^2$, whereby the said sight is secured by means of screws $d$ to the ordinary day-sight A, which may be attached to a vertically-adjustable sight-bar by a pin, screw, or bolt passed through the eye $A'$. The socket $c$ has formed or fixed thereon a bridge or frame $e$, the upper part or cross-bar of which is provided with two inclined reflecting surfaces $a$, between which is a non-reflecting-surface equal or nearly equal in length to the reflecting-surface $a$ of the fore sight.

The illuminated fore sight (shown in Figs. 3 and 4) has an eye $f$ formed or fixed on the socket or holder $c$. This eye fits upon the upper part of the day-sight B and is secured thereon by means of a screw $g$. The day-sight B is provided with a screw $B'$, whereby it may be firmly secured in place. The lamp socket or holder $c$ has formed or fixed thereon a bridge or frame $e$, the upper part or cross-bar of which is provided with the inclined reflecting-surface $a$. The lamp $b$ is secured in a plug $h$, of insulating material, having a central screw $h'$ and an external metal ring $h^2$. This plug is connected by the screw $h'$ with another plug $j$, of insulating material, having a metal core $j'$ and fixed in a metal tube $k$, which is secured in a block or piece $k'$, of insulating material. The conducting-wires from an electric battery are secured to this piece $k'$, of insulating material, and are connected with the leading-in wires of the lamp $b$, as follows, viz: One wire from the battery is connected with the metal core $j'$ and the other with the tube $k$. One of the leading-in wires of the lamp is passed through the plug $h$ and clamped between the ring $h^2$ and tube $k$, while the other leading-in wire is connected with the screw $h'$. A spiral spring $l$ surrounds the plug $h$. One end of this spring is inserted in a hole in the tube $k$. The other end thereof bears against a shoulder $c^3$ in the socket or holder $c$ when the lamp and its adjuncts are inserted therein. A pin or stud $k^2$ is fixed in the tube $k$, and is adapted to enter a bent or L-shaped slot $c^4$ in the socket $c$ for the purpose of securing the lamp and its adjuncts in the said socket. At the inner end of this slot there is a slight recess, in which the said pin or stud will be retained by the action of the spring $l$, so that the piece $k'$ and tube $k$ must be forcibly turned to disengage the said pin or stud.

I may, if desired, provide other suitable means for securing the lamp in the socket and for making the necessary connections between the lamp and the battery.

I sometimes insert in the hole $c'$ in the socket $c$ a piece of colored glass or stone, as shown in Fig. 3, so that the rays of light passing to the reflecting-surface will have any desired color imparted to them.

It will be seen that by the herein-described improvements I provide a very efficient open sight or window-sight, the frame $e$ being so constructed and arranged that it presents a very narrow edge to the eye of the observer, and therefore offers practically no obstruction to the view.

In the combined day and night rear sight (shown in Figs. 5 and 6) two triangular projections $m$ are formed on the frame $e$ above the reflecting-surfaces $a$. The socket or holder $c$ has formed or fixed thereon the eye $A'$, for attaching the sight to a vertically-adjustable sight-bar.

In the combined day and night fore sight (shown in Figs. 7 and 8) a semi-spherical projection $n$ is formed on the frame $e$ above the reflecting-surface $a$ for use in daylight in combination with the projections $m$ on the rear sight. The screw $B'$ is formed with or firmly attached to the socket or holder $c$.

Fig. 9 shows a combined day and night rear sight, in which the inclined reflecting-surface $a$ is formed on the extremity of a curved arm $p$, and Fig. 10 shows a corresponding fore sight, in which the inclined reflecting-surface $a$ and the semi-spherical projection $n$ are formed on an arm $p'$, curved in the reverse direction to that of the arm $p$.

Figure 12:
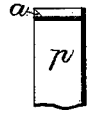
Figure 13:
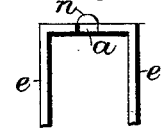
Figure 14:

In Figs. 11 and 12 is shown another modification of my rear sight, wherein two bent arms $p$ are so arranged that their pointed ends meet midway between their vertical portions and are provided with inclined reflecting-surfaces $a$. Figs. 13 and 14 show part of a fore sight for use in combination with the rear sight shown in Figs. 11 and 12.

Figure 15:
Figure 16:
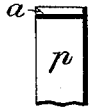

Figs. 15 and 16 show part of a rear sight, in which there is a single inclined reflecting-surface $a$ on the pointed end of a bent arm $p$. Figs. 17 and 18 show similar views of a corresponding fore sight.

Figs. 19, 20, and 21 show other forms of sight, in which the inclined reflecting-surfaces $a\ a$ are formed on the pointed ends of curved arms $p\ p'$.

In some instances I leave an opening or gap in the strip, bar, or wire of the rear sight and arrange the same so that the rays from the lamp are reflected from the two sides of the opening, thus forming two points of light, between which the reflecting-surface of the fore sight may be seen.

Figs. 22 and 23 illustrate an advantageous method of providing for attaching my night-sight to an ordinary day rear sight, so that it may be readily removed therefrom. For this purpose an angle-piece $q$, having a dovetail projection or rib $q'$, is attached to the night-sight, and a piece $r$, having a corresponding dovetail groove $r'$, is attached to the ordinary day-sight A. When the rib $q'$ is inserted in the groove $r'$ and pressed downward, the angle-piece $q$ will come against the top of the piece $r$, and thus the night-sight will be supported and held in place upon the day-sight.

Figs. 24 and 25 illustrate a similar method of attaching my night-sight to an ordinary day fore sight, the night-sight having attached thereto a plate $q^2$, provided with a dovetail projection or rib $q'$, and the day-sight being provided with a corresponding dovetail groove $r'$.

To provide for showing different-colored rays from the front and rear sights, I sometimes use electric lamps with globes or bulbs of colored glass, or I arrange at the edge of the reflector pieces of colored glass or of colored tinsel or other substance to reflect colored rays toward the observer.

My improved sight is more advantageous than those in which a refractor or lens is employed, inasmuch as the rays of light are dispersed in many directions by the lens, whereas by my reflector they are directed along the line of sight in a parallel or nearly parallel beam. Moreover, as above stated, my reflector, being of metal, is not liable to breakage or other injury.

What I claim is—

1. An illuminated or night sight provided with a concealed or screened lamp, and with a reflecting metallic surface, upon which some of the rays of light emanating from the said lamp will impinge, and which will reflect the said rays along the line of sight.

2. An illuminated or night sight comprising a lamp inclosed in a socket or holder having an aperture for the passage of rays of light from the said lamp and a reflecting-surface arranged in combination with the said lamp and socket or holder, and whereby some of the said rays will be reflected directly along the line of sight without passing through a lens.

3. An illuminated or night sight comprising a lamp inclosed in a socket or holder having an aperture for the passage of rays of light from the said lamp, and an inclined flat surface for reflecting some of the said rays directly along the line of sight, substantially as and for the purpose set forth.

4. In an illuminated or night sight, the combination, with a concealed or screened lamp, of a reflecting-surface which reflects along the line of sight some of the rays emanating from the said lamp, and beneath which there is a clear space to permit the view of the object at which the gun is to be directed.

5. In an illuminated or night sight, the combination, with a concealed or screened lamp, of an inclined reflecting-surface formed on the upper part or cross-bar of an open sight or window-sight, for the purpose above specified.

6. The combination of front and rear sights, each comprising a concealed or screened lamp, and a reflecting-surface which reflects along the line of sight, some of the rays emanating from the said lamp, and beneath which there is a clear space to permit the view of the object against which the gun is to be directed, substantially as and for the purposes set forth.

7. The combination of a lamp $b$, a socket or holder $c$, in which the said lamp is inclosed, and which is provided with an aperture $c'$, a plug $h\ k\ k'$, supporting the said lamp and provided with a pin or stud $k^2$, adapted to enter a bent groove in the said socket, and a spring $l$, attached at one end to the said plug and bearing at its other end against a shoulder $c^3$ in the said socket, substantially as and for the purposes set forth.

8. The combination, with a day-sight, of an illuminated or night sight fitting upon the said day-sight or a portion thereof and comprising a concealed or screened lamp and an inclined reflecting-surface upon which some of the rays of light from the lamp will be directly projected, and which will reflect the said rays directly along the line of sight, substantially as and for the purposes set forth.

In testimony whereof I have hereunto signed my name in the presence of two subscribing witnesses.

HUBERT HENRY GRENFELL.

Witnesses:
 W. A. JACKSON,
 CHAS. B. BURDON,
  *Both of 45 Southampton Buildings.*